United States Patent [19]
Schmitt

[11] Patent Number: 5,443,740
[45] Date of Patent: Aug. 22, 1995

[54] PROCESS FOR THE CONDITIONING OF ION EXCHANGE RESINS

[75] Inventor: Serge Schmitt, Hagenthal-le-Bas, France

[73] Assignee: Christ AG, Aesch, Germany

[21] Appl. No.: 121,560

[22] Filed: Sep. 16, 1993

[30] Foreign Application Priority Data

Oct. 7, 1992 [CH] Switzerland ............... 3132/92

[51] Int. Cl.⁶ .................................................. C02F 1/42
[52] U.S. Cl. ................................. 210/673; 210/674; 210/900; 210/670
[58] Field of Search ............ 210/900, 259, 674, 660, 210/670, 673

[56] References Cited

U.S. PATENT DOCUMENTS

| | | | |
|---|---|---|---|
| 3,607,739 | 9/1971 | Thorborg | 210/676 |
| 3,617,554 | 11/1971 | Thorborg | 210/664 |
| 3,791,866 | 2/1974 | Kunin et al. | 210/677 |
| 3,905,903 | 9/1975 | David | 210/675 |
| 3,939,071 | 2/1976 | Katzakian, Jr. et al. | 210/674 |
| 4,118,317 | 10/1978 | Neeb et al. | 210/32 |
| 4,153,761 | 5/1979 | Marsh | 210/759 |
| 4,207,397 | 6/1980 | Davis et al. | 210/677 |
| 4,387,026 | 6/1983 | Woolacott | 210/669 |
| 4,430,226 | 2/1984 | Hegde et al. | 210/638 |
| 4,540,715 | 9/1985 | Waatti et al. | 521/26 |
| 4,698,153 | 10/1987 | Matsuzaki et al. | 210/192 |
| 4,770,790 | 9/1988 | Oberhofer | 210/673 |
| 5,124,033 | 6/1992 | Ohmi et al. | 210/900 |
| 5,124,362 | 6/1992 | Auerswald et al. | 521/26 |
| 5,248,395 | 9/1993 | Rastelli et al. | 203/41 |

FOREIGN PATENT DOCUMENTS

| | | |
|---|---|---|
| 0190739 | 8/1986 | European Pat. Off. . |
| 0265031 | 4/1988 | European Pat. Off. . |
| 2341921 | 9/1977 | France . |
| 3504033 | 8/1985 | Germany . |

*Primary Examiner*—Cynthia L. Nessler
*Attorney, Agent, or Firm*—Wenderoth, Lind & Ponack

[57] ABSTRACT

For the conditioning of ion exchange resins, pure water is recirculated over a bed of the resin to be purified or of the resins to be purified. The pure water has a residual salt content of less than 50 ppb and a content of free acids or free bases of less than 5,000 ppb. The organic and inorganic substances washed out of the resin or the resins are removed continuously from the circulating water by methods for the purification of water. The process can be used for conditioning the ion exchange resins used in an ultra pure water production system.

14 Claims, 1 Drawing Sheet

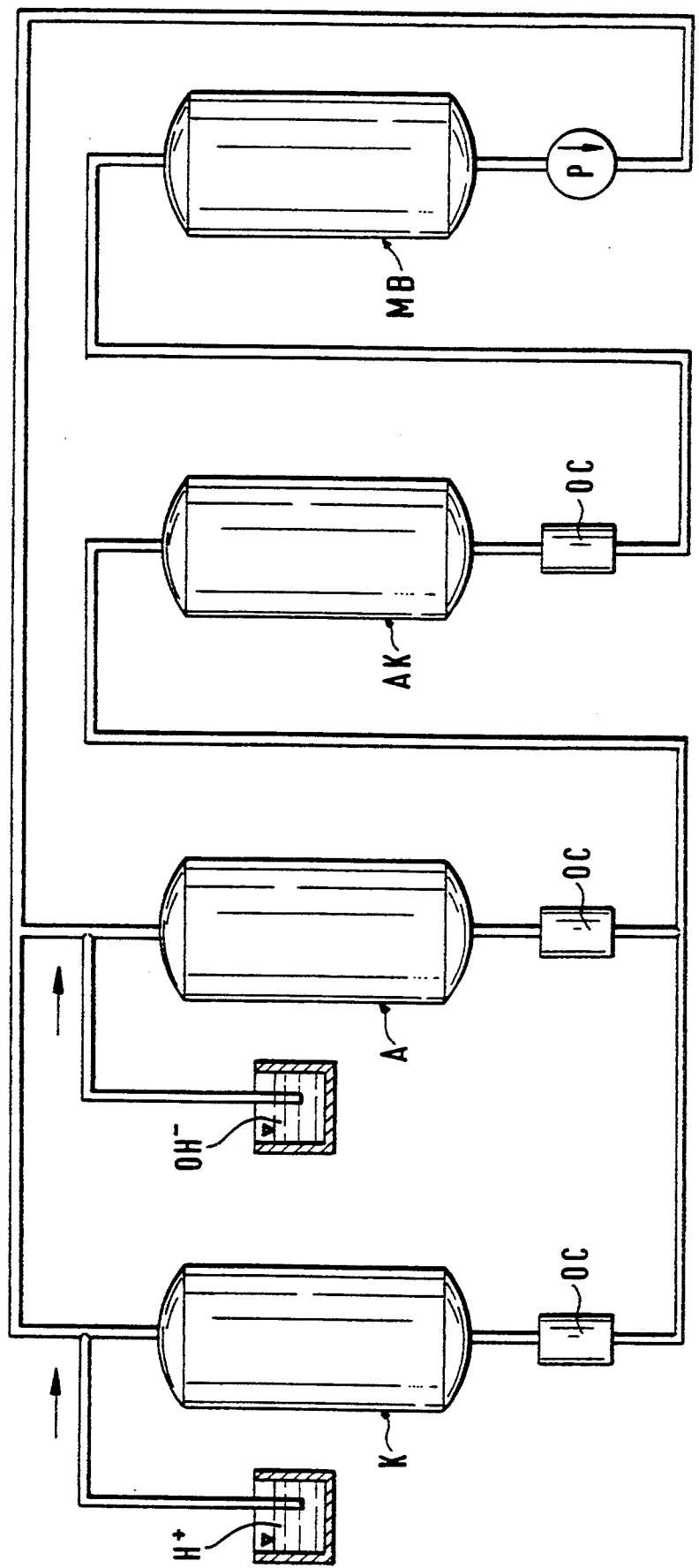

PROCESS FOR THE CONDITIONING OF ION EXCHANGE RESINS

BACK OF THE INVENTION

Ion exchange resins are indispensable in the preparation of ultra pure water (UPW). The purer the ion exchange resins, the purer the UPW which can be produced. The purity of the resins prepared according to the prior art or of the resins regenerated after use, once again according to the prior art, is subject to limits which determine the currently achievable UPW quality.

EP-B-0 265 031 of the Aquafine Corporation, a manufacturer of UV photoreactors, discloses the removal of organic material from an ion exchange resin by washing with water, which material is then oxidized by irradiating the water containing the organic material in an oxidation chamber with UV light having a wavelength of 185 nm with formation of, primarily, $CO_2$, after which the water is recycled through the same ion exchange resin in order to absorb the carbon dioxide thereon. In this way, the ion exchange resin is conditioned for further use, i.e. freed from organic material down to a certain residual content, by repeated circulation of the water through the ion exchange resin and the oxidation chamber.

This process has the following deficiencies:

1. It is intended to remove only organic material, it being assumed that all organic substances contained in the water are degraded by exposure to UV light to give $CO_2$, which is then bound in the manner described to the ion exchange resin to be purified.

However, it is now known that by no means all organic substances are degraded by irradiation with UV light. The major part of the organic material is either not changed at all or merely converted into a more highly oxidized form which, as a rule, is then bound to the resin even more firmly than the original substance. If the ion exchange resin is used for ultra pure water production (UPWP), the more highly oxidized organic substances may, however, be eluted again and may enter the UPW.

Even if all organic materials were degraded to $CO_2$, the latter should not be collected on the ion exchange resin to be purified. Even less desirable is the accumulation of the more highly oxidized organic compounds on the ion exchange resins.

2. The organic material which is extracted from the ion exchange resin should merely be removed by irradiation with UV light, with or without catalyst. As stated above, this process is effective only to a limited extent.

Removal of organic substances, referred to rather inexactly as the removal of TOC (total organic carbon or total oxidizable carbon), has become very important in recent years, and there are many known methods for this purpose which were evidently not familiar to the proprietor of EP-B-0 265 031.

3. The process according to EP-B-0 265 031 is used in practice only for conditioning mixed resins (mixed beds). On the other hand, the separate purification of ion exchange resins which are used for ultra pure water production as a mixture, i.e. in mixed beds, has the following decisive advantages:

a) The extraction of organic substances is frequently influenced by the pH. It is therefore advantageous if the extraction of the resins is carried out separately at different pH values within a range which is as wide as possible.

b) The washing of the cation exchange resin in the weakly acidic range and the washing of the anionic exchange resin in the weakly basic range permit an improvement in the regeneration of the resins compared with the possibilities of the prior art.

SUMMARY OF THE INVENTION

The invention covers a wider range of applications than the process according to EP-B-0 265 031 and eliminates its deficiencies. According to the invention, 1. not only organic substances but also inorganic substances are to be eluted from the resins and removed from the purification circulation;
2. the organic substances extracted from the resins are to be removed not only by irradiation with UV light (with UV light with a wavelength of 185 nm) with or without catalyst, but all known suitable methods or agents, individually or in any suitable combination with or without catalysts, are to be used, for example ozone, per compounds, UV light without restriction to a certain wavelength, ionization radiation and adsorbents;
3. not only mixed ion exchange resins but preferably also resins of separate pure types are to be purified, in particular at a pH differing from 7.

The invention therefore relates to a process for the conditioning of ion exchange resins, wherein water is recirculated over a bed of the resin to be purified or of the resins to be purified and the organic and inorganic substances washed out from the resin or the resins are removed continuously from the circulating water by methods for the purification of water.

BRIEF DESCRIPTION OF THE DRAWING

The drawing represents an apparatus which can be used to conduct the process according to the present invention.

DESCRIPTION OF THE PREFERRED EMBODIMENTS

Further features of this resin conditioning process are that it is used for the further purification of ion exchange resins straight from the factory or ion exchange resins purified or regenerated by known processes, only the small residual contents—but the ones which are decisive for UPW production—of foreign substances which still remain on the resins after the use of known processes are removed from the resins, the water recirculating over the resins to be conditioned is pure water whose content of neutral salts is less than 50 ppb, preferably less than 10 ppb, and whose contents of free acids or free bases are less than 5,000 ppb, preferably less than 500 ppb (the concentrations customary in known processes are 10,000 to 100,000 times higher) and in contrast to known regeneration and purification processes, which are applied only for hours, the conditioning lasts for weeks or months.

Substances which promote the extraction of organic and/or inorganic substances are preferably metered into the water flowing to the resin or to the resins; for example, a possible procedure is one in which, in the case of the conditioning of cation exchange resins, acid is metered into the water to a pH directly below the neutral point, for example in the range from pH 5 to 6, in order to increase the degree of regeneration of the resins, and, in the case of the conditioning of anion exchange resins, alkali is metered into the water to a pH directly above the neutral point, for example in the range from pH 8 to 9, in order to increase the degree of regeneration of the resins.

Surfactants which do not adversely affect the resins to be purified may likewise be added to the water, in order to improve the extraction of organic or inorganic substances.

It is also advantageous if substances which change the surface structure of the resin or of the resins in such a way that its or their action in ultra pure water production is improved, for example oxidizing agents, which increase the absorptivity of the resin for undissolved substances, are metered, during or after the conditioning, into the water flowing to the resin or to the resins.

For removal of the organic and/or inorganic substances washed out of the resin or of the resins, ozone, per compounds, for example hydrogen peroxide, ionizing radiation, adsorbents, for example active carbon, and cation and/or anion exchange resins, for example mixed-bed filters, either individually or in combination and with or without a catalyst, may be used, followed, if required, by irradiation with UV light.

Referring to the drawing the process according to the invention can be carried out, for example, by a procedure in which protons, preferably from sulfuric acid, are metered into the water flowing to a filter (K) with the cation exchange resins to be purified, in an amount such that the water has a pH below the neutral point, preferably in the range between 6 and 5;

alkali, preferably sodium hydroxide solution, is metered into the water flowing to a filter (A) with the anion exchange resins to be purified, in an amount such that the water has a pH above the neutral point, preferably in the range between 8 and 9;

ozone and hydrogen peroxide are metered, at OC, into the water emerging from the filters (K) and (A) respectively, separately or after combination thereof;

the water treated in this manner is passed over an active carbon filter;

the water emerging from the active carbon filter is, if required, irradiated with UV light, and the water treated in this manner is passed through a mixed-bed filter.

The process according to the invention can be integrated in an ultra pure water production system (UPWPS), so that the fresh resins conditioned according to the invention, or the resins regenerated according to the prior art and conditioned according to the invention, can be used for water purification without transfer and intermediate storage, and at most after transport in permanently installed pipes. In an expedient procedure, two mixed beds are connected in parallel, one of which is in operation while the resins from the other are separately conditioned. Because traces of foreign substances are still eluted from the resins even after extremely long conditioning periods of, for example, more than one month, switching is effected from one mixed bed to the other, for example every 6 months.

The attached drawing schematically shows an embodiment of the process according to the invention. In the drawing, K denotes a cation exchange resin bed which is to be purified and is present in a resin filter;

A denotes an anion exchange resin bed which is to be purified and is present in a resin filter;

AK denotes an active carbon filter;

MB denotes a mixed-bed ion exchange filter;

OC denotes a stage for the degradation (for the decomposition) of dissolved organic substances;

$H^+$ denotes the metering of acid;

$OH^-$ denotes the metering of alkali.

The following procedure can be adopted according to this scheme:

Acid $H^+$, preferably sulfuric acid, is metered into the water flowing to the resin filter K, in an amount such that a pH below the neutral point, preferably in the range between 6 and 5, results in this water. The hydrogen ion concentration is thus 10 to 100 times higher than at the neutral point, so that the hydrogen ion concentration on the resin, i.e. the degree of regeneration of the resin, is re-established according to the following, generally valid equilibrium relationship:

$$RNa/RH = k \times [Na]/[H]$$

Here, Na represents all cations, the major part of which however consists of sodium. Thus, RNa denotes the cation concentration on the resin RH denotes the hydrogen ion concentration on the resin

[Na] denotes the cation concentration in the water

[H] denotes the hydrogen ion concentration in the water, which by definition increases by a factor of 10 when the pH decreases by one unit and k denotes a temperature-dependent coefficient specific for each resin quality or resin grade.

In order to ensure that the cation concentration [Na] is as low as possible during subsequent use of the resin for the removal of cations from the water, as a result of the conditioning of the resin the quotient RNa/RH must be as small as possible or, in other words, the degree of regeneration of the resin, expressed as $$RH/(RH+RNa),$$

must be as large as possible. In order to achieve this object, the hydrogen ion concentration [H] is increased during the conditioning, in this example by a factor of 10 (pH 6) to 100 (pH 5).

In an analogous manner, alkali $OH^-$ is metered into the water which flows through the filter A with the anion exchange resin to be purified, in an amount such that a pH above the neutral point, preferably between 8 and 9, results.

A stage OC for the degradation of the extracted organic substances is present downstream of the two filters K and A. In the example shown in FIG. 1, a stage OC follows each of the filters K and A; in practice, however, eluates from the filters K and A may also be combined and passed together through a single stage OC. This may consist, for example, of the metering of ozone and hydrogen peroxide.

Excess ozone and a part of the undecomposed organic substances are adsorbed onto the active carbon filter AK present downstream of the stage or of the stages OC.

A further stage OC for the degradation of organic substances, for example irradiation with UV light, may follow the active carbon filter AK.

Finally, the water passes through a mixed-bed filter MB, on which acid and alkali residues, reaction products formed in the degradation of the organic substances and inorganic impurities washed out of the active carbon filter AK by a reaction which in principle is undesirable but presents no problems here are bound. This mixed-bed filter MB should contain ion exchange resins which are particularly suitable for this purpose.

A neutral water free of organic and inorganic substances is available at the exit of the mixed-bed filter.

What is claimed is:

1. A process for the conditioning of ion exchange resins used in the production of ultra pure water, said resins being selected from the group consisting of fresh resins and newly regenerated resins, said process comprising recirculating pure water having a residual salt content of less than 50 ppb and a content of free acid or free base of less than 5,000 ppb over a bed of the resin to be purified or of the resins to be purified, said free acid providing a source of protons (H+) and said free base providing a source of alkali (OH−), said process further comprising removing organic and inorganic substances washed out of the resin or the resins continuously from the circulating water.

2. A process as claimed in claim 1, wherein
said protons (H+) are metered into the water flowing to a first filter with the cation exchange resins to be purified, in an amount such that the water has a pH in the range between 6 and 5;
said alkali (OH−) is metered into the water flowing to a second filter with the anion exchange resins to be purified, in an amount such that the water has a pH in the range between 8 and 9;
ozone and hydrogen peroxide are metered into the water emerging from said first and second filters respectively, separately or after combination thereof;
the water treated in this manner is passed over an active carbon filter; and
the water emerging from the active carbon filter is passed through a mixed-bed filter.

3. A process as claimed in claim 1, wherein oxidizing agents are metered, during or after the conditioning, into the water flowing to the resin or to the resins in order to change the surface structure of the resin or of the resins in such a way that its or their action in the preparation of ultra pure water is improved.

4. A process as claimed in claim 1, wherein said organic or said inorganic substances washed out of the resin or the resins are removed by an agent selected from the group consisting of ozone, per compounds, ionizing radiation, adsorbents, catalysts, UV light, cation exchange resins, anion exchange resins, and combinations thereof.

5. A process as claimed in claim 4, wherein the per compound is hydrogen peroxide, the adsorbent is active carbon, and the cation and anion exchange resins define mixed-bed filters.

6. A process as claimed in claim 1, wherein
said protons (H+) are metered into the water flowing to a first filter with the cation exchange resins to be purified, in an amount such that the water has a pH below the neutral point;
said alkali (OH−) is metered into the water flowing to a second filter with the anion exchange resins to be purified, in an amount such that the water has a pH above the neutral point;
ozone and hydrogen peroxide are metered into the water emerging from said first and second filters respectively, separately or after combination thereof;
the water treated in this manner is passed over an active carbon filter; and
the water emerging from the active carbon filter is passed through a mixed-bed filter.

7. A process as claimed in claim 6, wherein the protons (H+) are protons from sulfuric acid, and the alkali (OH−) is sodium hydroxide solution.

8. A process as claimed in claim 6, wherein the water emerging from the active carbon filter is irradiated with UV light before it is passed through the mixed-bed filter.

9. A process as claimed in claim 1, wherein substances which promote the extraction of said organic or said inorganic substances are metered into the water flowing to the resin or to the resins.

10. A process as claimed in claim 9, wherein surfactants which do not adversely affect the resins to be purified are added to the water.

11. A process as claimed in claim 9, wherein, in the conditioning of cation exchange resins, said free acid is metered into the water to a pH in the range from pH 5 to 6 in order to increase the degree of regeneration of the resins.

12. A process as claimed in claim 9, wherein, in the conditioning of anion exchange resins, said free base is metered into the water to a pH in the range from pH 8 to 9 in order to increase the degree of regeneration of the resins.

13. A process as claimed in claim 9, wherein said resin is a cation exchange resin, and said free acid is metered into the water to a pH directly below the neutral point in order to increase the degree of regeneration of the resin.

14. A process as claimed in claim 9, wherein said resin is an anion exchange resin, and said free base is metered into the water to a pH directly above the neutral point in order to increase the degree of regeneration of the resin.

* * * * *

UNITED STATES PATENT AND TRADEMARK OFFICE
CERTIFICATE OF CORRECTION

PATENT NO. : 5,443,740
DATED : August 22, 1995
INVENTOR(S) : Serge SCHMITT

It is certified that error appears in the above-indentified patent and that said Letters Patent is hereby corrected as shown below:

On the Title page, item [73] Assignee: change "Germany" to --Switzerland--.

Signed and Sealed this

Thirteenth Day of February, 1996

Attest:

BRUCE LEHMAN

Attesting Officer

Commissioner of Patents and Trademarks